Nov. 2, 1937.  H. T. WEEG  2,097,503
LIQUID DISPENSER
Filed Dec. 12, 1936   2 Sheets-Sheet 2
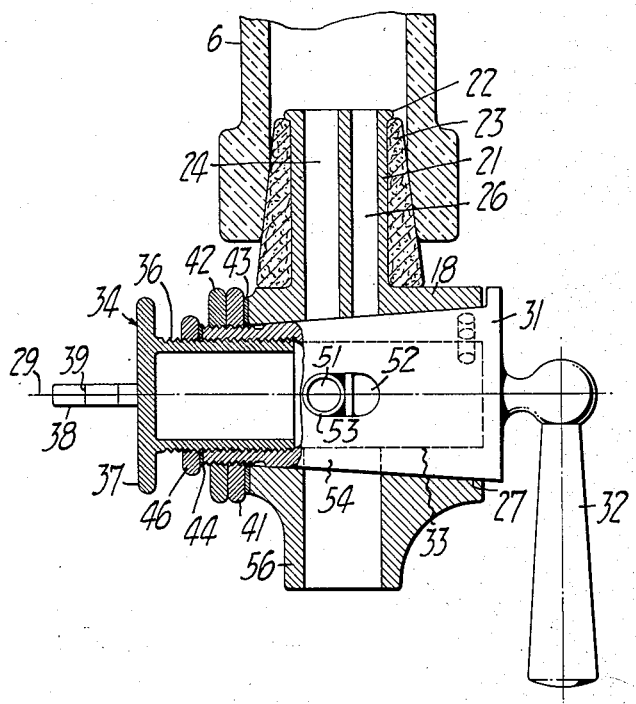
FIG_4_
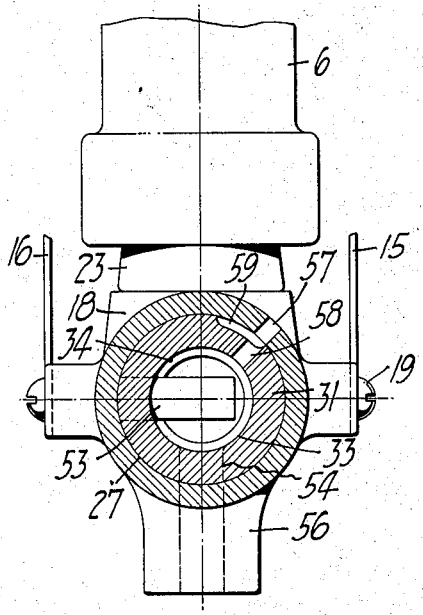
FIG_5_
FIG_6_
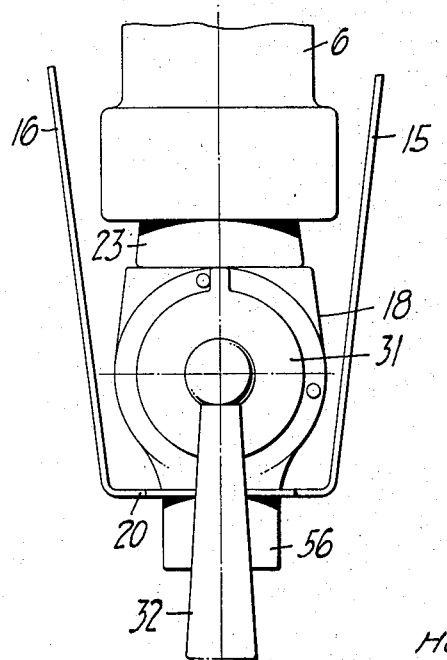
INVENTOR.
Herman T. Weeg
BY Marcus Lothrop
ATTORNEY.

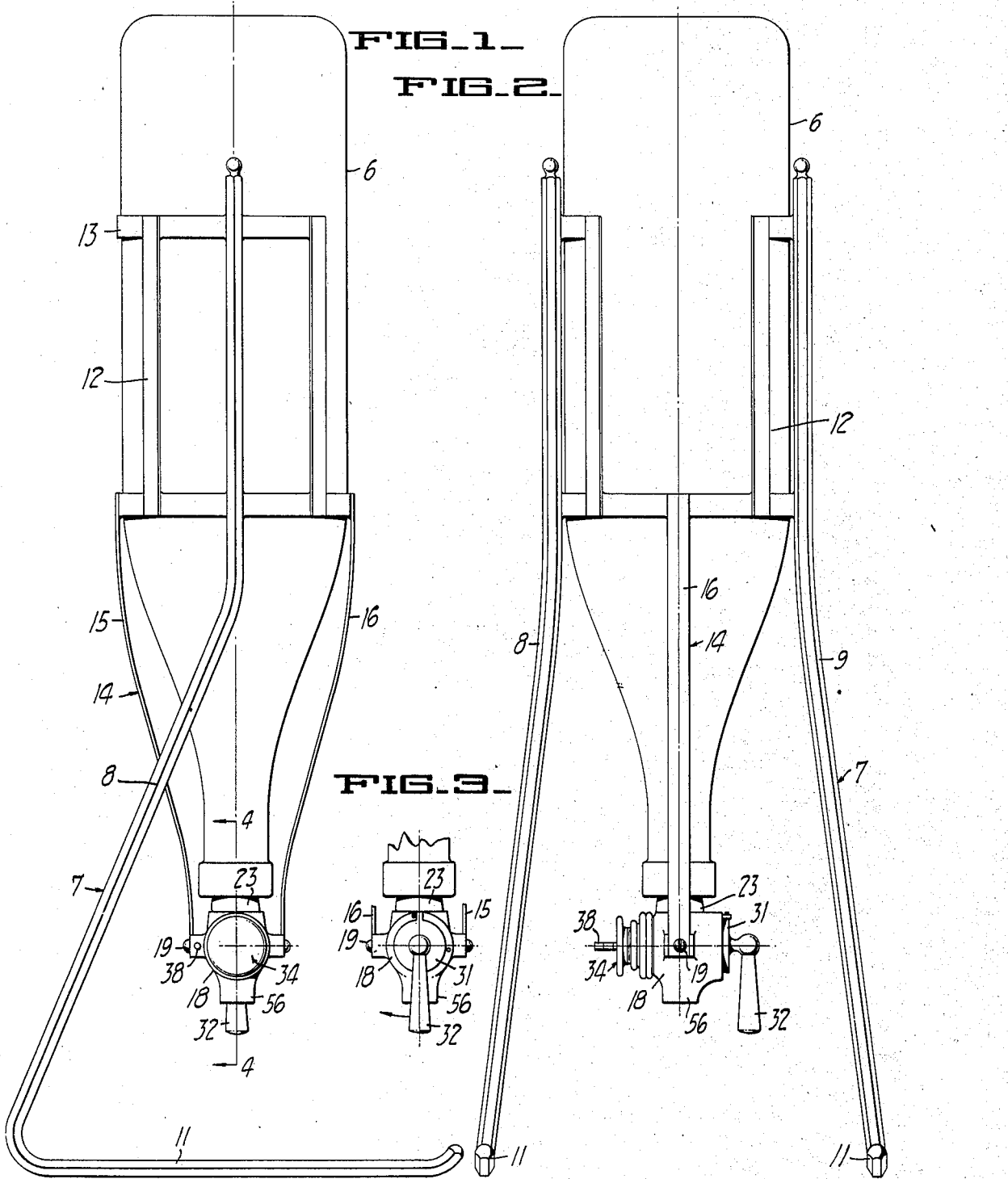

Patented Nov. 2, 1937

2,097,503

UNITED STATES PATENT OFFICE 2,097,503

LIQUID DISPENSER

Herman T. Weeg, San Francisco, Calif., assignor to Western Research & Development Co., a syndicate composed of Herman T. Weeg, Alfred Whittell, Ronald Tilton, and John Dinwiddie, San Francisco, Calif.

Application December 12, 1936, Serial No. 115,567

1 Claim. (Cl. 221—117)

My invention relates to means for releasing liquid from containers and is particularly concerned with a means for releasing a selected, measured quantity of a liquid from a generally closed container such as an inverted bottle.

In dispensing relatively small quantities of liquid from relatively large containers, for example in dispensing brandy or cognac from a bottle containing a hundred ounces or so, it is desirable to dispense with considerable accuracy a measured quantity from the bottle at each operation of the dispensing device. For example, seven-sixteenths of an ounce or fifteen-sixteenths of an ounce is a usual quantity to dispense, and it is desirable to do this without undue waste or variation in the quantity for successive operations of the device.

An object of my invention is to provide a liquid dispenser in which the quantity dispensed may be varied within limits.

Another object of my invention is to provide a dispensing device in which the liquid dispensed is very accurately controlled as to selected amount.

A further object of my invention is to provide a dispensing device in which the replacement of liquid by air will be very rapid in order that successive operations can follow each other quickly.

Another object of my invention is to provide means for dispensing liquid in a simple form which is susceptible to ready cleaning and sterilization.

The foregoing and other objects are attained in the embodiments of the invention illustrated in the drawings, in which—

Fig. 1 is a side elevation of a liquid dispenser in accordance with my invention, applied to a bottle of liquid to be dispensed and mounted in a suitable dispensing stand.

Fig. 2 is a front elevation of the structure shown in Fig. 1.

Fig. 3 is a side elevation of a part of the dispenser mechanism.

Fig. 4 is a cross-section the plane of which is indicated by the line 4—4 of Fig. 1.

Fig. 5 is a cross-section the plane of which is indicated by the line 5—5 of Fig. 4.

Fig. 6 is a view, similar to Fig. 3, of a modified form of my invention.

In its preferred form, the liquid dispenser of my invention includes a housing adapted to engage an inverted bottle of liquid to be dispensed and within which there is a hollow plug cock in one position adapted to register with a pair of conduits through the engaging means and having within itself a pair of passages of different lengths, so that simultaneously liquid can be received from the bottle and air returned thereto,—all in combination with means effective in another position of the plug cock for releasing the measured contents thereof while isolating the interior of the bottle from the interior of the plug cock.

The dispenser of my invention is preferably utilized with a relatively large glass bottle 6 containing a liquid such as brandy or cognac. The bottle is conveniently carried in a metal supporting stand 7 which is comprised of a pair of supporting legs 8 and 9 having generally horizontal feet 11 thereon and extending upwardly in a suitable fashion to engage a basket 12. This is preferably a metal back 13 encompassing slightly more than half the periphery of the bottle in order to prevent it from moving horizontally, and being cut away in the forward portion in order to expose any label or comparable indicium on the bottle. Also included in the basket or cradle 12 is a support 14 which can comprise a pair of straps 15 and 16 engaging a housing 18 either by means of studs 19 or comparable fastening devices, or by a resiliently lined collar 20 (Fig. 6) against which the housing 18 abuts.

In the former case the entire stand 7 is inverted while the bottle is engaged therewith after being uncorked, but in the latter instance the separate housing 18 itself is first put upon the bottle when the uncorked bottle is in an upright position and then the housing and bottle as a unit are inverted and put into the supporting stand. In either event, the housing 18 is provided with a neck 21 preferably integrally formed therewith and at its upper end enlarged to provide a flange 22 overlying a conical cork 23 or comparable sealing material adapted frictionally to engage the neck of the bottle 6 in fluid-tight and air-tight relationship. Piercing the neck 21 are passages 24 and 26, forming a pair of substantially identical channels through the housing 18 and establishing communication between the interior of the bottle 6 and the interior of a tapered or conical transverse bore 27 in the housing, which is symmetrical about a horizontal axis 29.

Adapted to rotate with a ground fit within the bore 27 is a plug cock 31 preferably rotatable about the axis 29 under the influence of an operating handle 32. In order that the interior of the plug cock may serve as a measuring device of variable capacity, I preferably make the interior thereof hollow to provide a chamber 33 which is closed on one side by a plug 34 the interior of which is hollow. The plug is preferably threaded as at 36 along its exterior to engage comparable threads on the interior of the plug 31, and is provided with a knurled terminus 37 for convenient manipulation into and out of the plug. A rod 38 on the housing 18 is provided with markings 39, so that the position of the knurled part 37 relative thereto is an indication of the capacity of the interior of the plug cock.

The parts are held in relationship by a jamb ring 41 which engages the exterior of the plug cock 31 and abuts the housing 18 so that axial movement is precluded. The jamb ring is locked by a locking ring 42. Between the jamb ring 41 and the housing is a washer 43 having a projection engaging a keyway (not shown) in the plug cock, so that the entire locking arrangement turns as a unit with the plug cock. In addition to the foregoing, and in order to preclude leakage along the threads 36, I may provide a resilient washer 44 thereon which is backed by a locking ring 46.

In order that in a selected position of the plug cock 31 the interior thereof may be placed in communication with the interior of the bottle 6, and so that the air within the interior chamber 33 will be promptly displaced in order to accelerate the rapidity of operation of the device, I preferably provide within the plug cock 31 a pair of passages 51 and 52 which are adapted to register with the conduits 24 and 26, respectively, but which in accordance with my invention are of unequal lengths; namely, the passage 51 being considerably longer than the passage 52 by being extended into a tube 53 extending across the major part of the interior of the chamber 33.

In the position of the device as shown in Fig. 2, the passages and conduits are all in registry, so that liquid flows through the conduit 24 and the passage 51 onto the bottom of the chamber 33 and, as it rises therein, displaces the previously contained air therefrom upwardly through the passage 52 and upwardly through the conduit 26 into the bottle 6. I have found that the inequality in length of the passages and conduits is beneficial in that it provides for an orderly and determined displacement of the air by the entering liquid so that no air cushions or pockets remain. The chamber is thus always filled with exactly the desired quantity of liquid at each operation.

When the interior of the chamber 33 has been filled by the plug cock 31 remaining in the position shown, the handle 32 is rotated by the operator until such time as the passages 51 and 52 are out of registry with the conduits 24 and 26, and until such time as an outlet opening 54 is in substantial registry with an outlet tube 56 forming part of the housing 18 and depending therefrom. In order to release the liquid from the chamber 33 through the registered openings 54 and 56, I provide an air bleeder port 57 in the housing 18, with which is adapted to register a passage 58 piercing the shell of the plug cock 31 and opening into a peripheral groove 59 therein, so that adequate opportunity is afforded for influx of atmospheric air as the measured quantity of liquid is being released from the interior of the chamber 33.

When all of the contained and measured liquid has been released from the interior of the chamber 33, the handle 32 is again rotated to its initial position, cutting off communication between the interior of the chamber 33 and the atmosphere through the port 57 and also cutting off communication between the opening 54 and the spout 56 and reestablishing communication between the passages 51 and 52 and the conduits 24 and 26, respectively, thereby recharging the chamber 33 with a measured quantity of liquid ready for a subsequent dispensation. The displacement of the air from the chamber 33 occurs very rapidly, so that successive operations of the structure can be afforded in immediate sequence without loss of accuracy and without waste. The structure is very simple and the various passages are straight and open for ready cleaning and sterilization.

I claim:

A liquid dispenser comprising a housing, means on said housing for engaging a container of liquid to be dispensed, a plug cock having a hollow interior rotatably mounted within said housing, a hollow plug movable into and out of said plug cock for varying the interior volume thereof, a pair of means of different length for establishing communication between the interior of said plug cock and said container in one position of said plug cock, and means effective in another position of said plug cock for admitting air to the interior of said plug cock and releasing liquid therefrom.

HERMAN T. WEEG.